United States Patent [19]
Nakayama

[11] Patent Number: 5,922,067
[45] Date of Patent: *Jul. 13, 1999

[54] MICROPROCESSOR EXECUTING INSTRUCTION HAVING OPERAND FIELD INCLUDING PORTION USED AS PART OF OPERATION CODE

[75] Inventor: Takashi Nakayama, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/529,606

[22] Filed: Sep. 18, 1995

[30] Foreign Application Priority Data

Sep. 20, 1994 [JP] Japan .................................. 6-250148

[51] Int. Cl.$^6$ ....................................................... G06F 9/30
[52] U.S. Cl. ............................................................ 712/208
[58] Field of Search ...................................... 395/376, 384

[56] References Cited

U.S. PATENT DOCUMENTS

| | | | |
|---|---|---|---|
| 4,099,299 | 7/1978 | Kancler | 395/375 |
| 4,219,874 | 8/1980 | Gusev et al. | 395/775 |
| 4,236,206 | 11/1980 | Strecker et al. | 395/375 |
| 4,241,397 | 12/1980 | Strecker et al. | 395/375 |
| 4,586,131 | 4/1986 | Caudel | 395/775 |
| 4,942,552 | 7/1990 | Merrill et al. | 395/826 |
| 5,592,635 | 1/1997 | Chan | 395/386 |

FOREIGN PATENT DOCUMENTS

| | | |
|---|---|---|
| 0 306 920 | 3/1989 | European Pat. Off. . |
| 0 535 820 | 4/1993 | European Pat. Off. . |
| 0 540 175 | 5/1993 | European Pat. Off. . |
| 59-148948 | 8/1984 | Japan . |

OTHER PUBLICATIONS

"MIPS R4000 Microprocessor User's Manual", *CPU Instruction Set Details*, 1991, pp. A–1 to A–9 etc.

G. Baker et al., "Instruction Execution Conditioned on Operand Addresses", IBM Technical Disclosure Bulletin, Jan. 1982, vol. 24, No. 8, pp. 4018–4022.

A. Tanenbaum, "Structured Computer Organization", 1976 Prentice–Hall, pp. 65–87.

A. Tanenbaum, "Structured Computer Organization" 1976, Prentice–Hall, pp. 73–79.

*Primary Examiner*—David Y. Eng
*Attorney, Agent, or Firm*—Young & Thompson

[57] ABSTRACT

A microprocessor is configured to generate a variety of differing operation codes, from a group of instructions having redundant operation fields. In particular, a decoder is configured to receive not only the operation field of such instructions, but also one or more least significant bits borrowed from the operand field. The microprocessor thereby generates an increased number of operation commands, without the need for a corresponding increase in the bit length of the operation field.

5 Claims, 4 Drawing Sheets

MICROPROCESSOR EXECUTING INSTRUCTION HAVING OPERAND FIELD INCLUDING PORTION USED AS PART OF OPERATION CODE

BACKGROUND OF THE INVENTION

The present invention relates to a microprocessor and, more particularly, to an improvement in a microprocessor executing an instruction for accessing a memory.

In general, each instruction consists of an operation field and an operand code. The operation field has an operation code necessary to perform a required operation, whereas the operand field has information necessary to access a register, a memory, a peripheral unit and so forth.

In accordance with a demand for high performance of a microprocessor, a number of instructions, i.e. a number of operation codes must be prepared. For this purpose, it is considered to increase the number of bits allotted to the operation field. However, in an instruction for accessing a memory, it is required to increase the number of bits allotted to the operand field, since the operand field needs a register field portion having information indicative of a base register storing a base address and an offset data field portion having data indicative of an offset value from the base address.

As an instruction for accessing a memory, there are a LOAD instruction and a STORE instruction. The LOAD instruction is such that a data stored in a memory is transferred to a register incorporated in a microprocessor, and the STORE instruction is such that a data stored in a register is transferred to a memory. Moreover, the data transfer between the memory and register is required to be performed in byte units in addition to word units, half-word units and so on. Thus, it is required to prepare a plurality of LOAD instructions and STORE instructions in accordance with the number of bytes to be transferred, as disclosed in "MIPS R4000 Microprocessor User's Manual", 1991, pp. A-1 to A-9 and so on.

Specifically, of instructions as disclosed in the above Manual, there are, as shown in FIG. 1, a one-byte LOAD (STORE) instruction 410, a two-byte LOAD (STORE) instruction 420, a four-byte LOAD (STORE) instruction 430, and an eight-byte LOAD (STORE) instruction 410. Each of these instructions 410, 420, 430 and 440 consists of an operation field 11 composed of 6 bits (Bit Nos. 31–26) and an operand field 10 composed of 26 bits. The operand field 10 consists of a first field portion 12 composed of 5 bits (Bit Nos. 25-21) indicative of a first register, a second field portion 13 composed of 5 bits (Bit Nos. 20-16) indicative of a second register, and a third field portion 14 composed of 16 bits (Bit Nos. 15-0) indicative of an immediate data or an offset data. The second field portion 12 (rt) designates a source or destination register, and a memory address is obtained by adding the content of a register designated by the first field portion 12 (base) and the offset value of the third field portion 14.

The instructions 410, 420, 430 and 440 have individual operation codes (Op-code) as shown below, according to the number of bytes to be transferred:

| Instruction | Operation Code |
| --- | --- |
| One-Byte LOAD | 100000 |
| Two-Byte LOAD | 100001 |
| Four-Byte LOAD | 100011 |
| Eight-Byte LOAD | 110111 |
| One-Byte STORE | 101000 |
| Two-Byte STORE | 101001 |
| Four-Byte STORE | 101011 |
| Eight-Byte STORE | 111111 |

In a data transfer performed by the LOAD or STORE instruction, since the memory address is representative of a byte address, when the four-byte LOAD or STORE instruction is, for example, executed, the least significant two bits of the memory address must be set to "0" in order to transfer four-byte data simultaneously. To this end, the least significant two bits of the offset field portion 14 are required to written as "0". If at least one of these two bits is written with "1", there occurs trap exception to check a mis-alignment of the memory address.

SUMMARY OF THE INVENTION

It is an object of the present invention to provide an improved microprocessor.

It is another object of the present invention to provide a microprocessor in which the number of instructions to be executed can be increased without expanding the number of bits allotted to an operation field.

It is still another object of the present invention to provide a microprocessor in which trap exception caused by an address mis-alignment is prevented.

A microprocessor according to the present invention comprises an execution unit executing a plurality of instructions, each of the instructions having an operation field and an operand field. Of the instructions, there are at least first and second instructions which have the same content of the operation field as each other. The executing unit discriminates a data processing operation required by the first instruction in response only to the content of the operation field thereof and discriminates a data processing operation required by the second instruction in response to the content of the operation field and a part of the content of the operand field thereof.

It is preferable that the part of the content of the operand field of the second instruction is caused to be "0" irrespective of the actual data thereof. Accordingly, there takes place no address mis-alignment in case of a LOAD or STORE instruction.

BRIEF DESCRIPTION OF THE DRAWINGS

The above and other objects, features and advantages of the present invention will be apparent from the following description taken in conjunction with the accompanying drawings, in which.

DETAILED DESCRIPTION OF THE PREFERRED EMBODIMENTS

Figure 2:
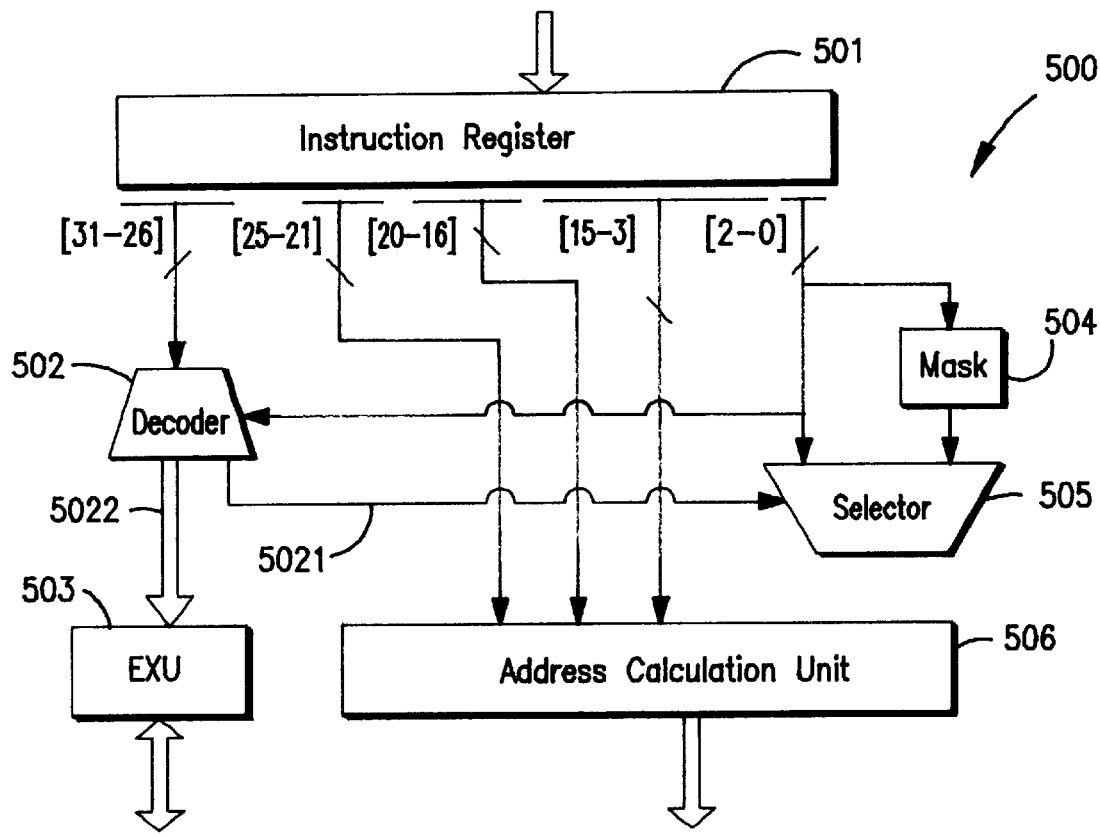
FIG. 2 is a block diagram illustrative of a microprocessor according to an embodiment of the present invention.

Referring now to FIG. 2, a microprocessor 500 according to an embodiment of the present invention includes an instruction register 501 into which an instruction to be executed is temporarily stored from a memory (not shown). This microprocessor 500 is constructed to support or execute various instructions similarly to the prior art microprocessor; however, the instructions as LOAD and STORE instructions executed by the microprocessor 500 are different in code format from those by the prior art.

Figure 1:
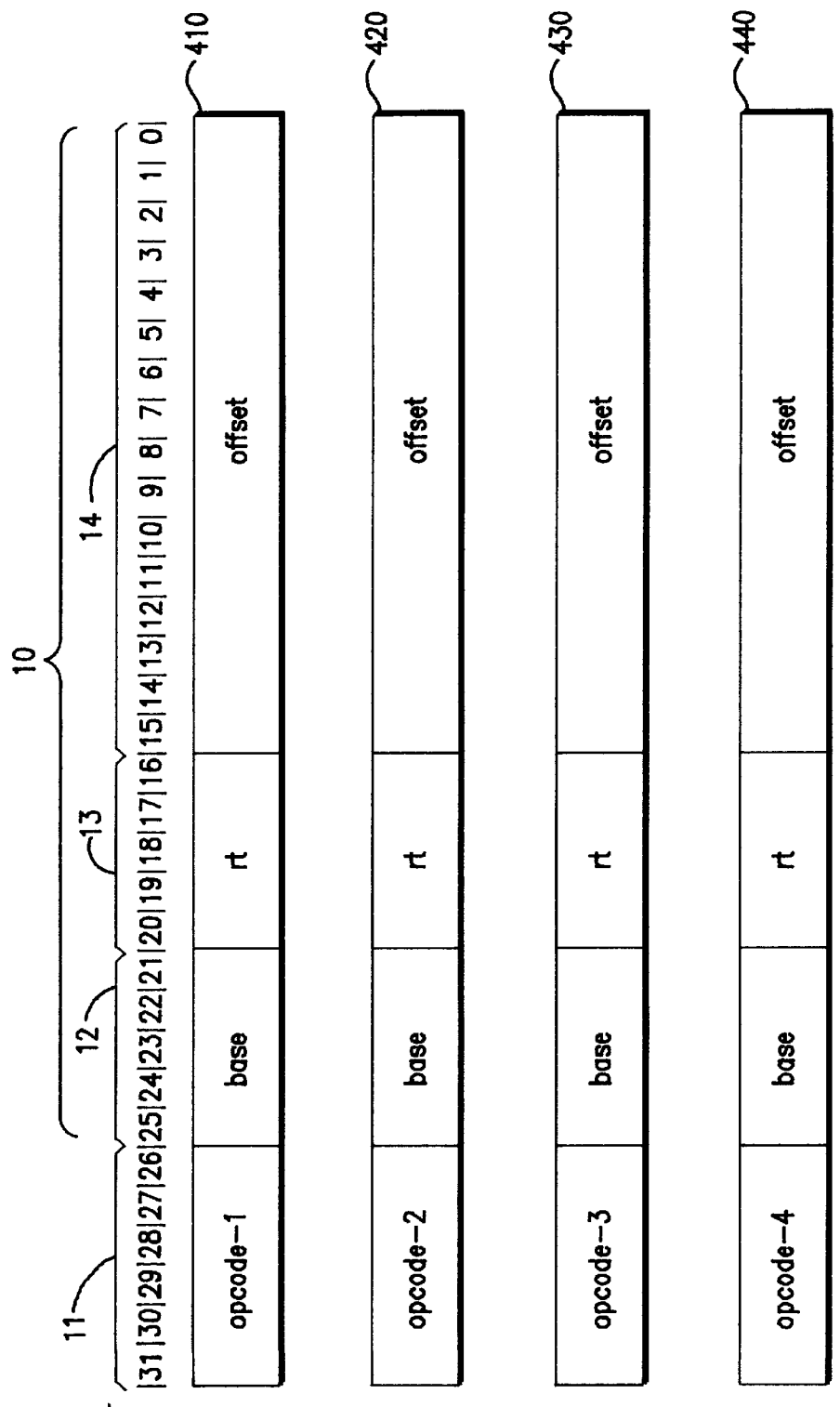
FIG. 1 is an instruction format diagram representative of LOAD or STORE instructions according to the prior art.
Figure 3:
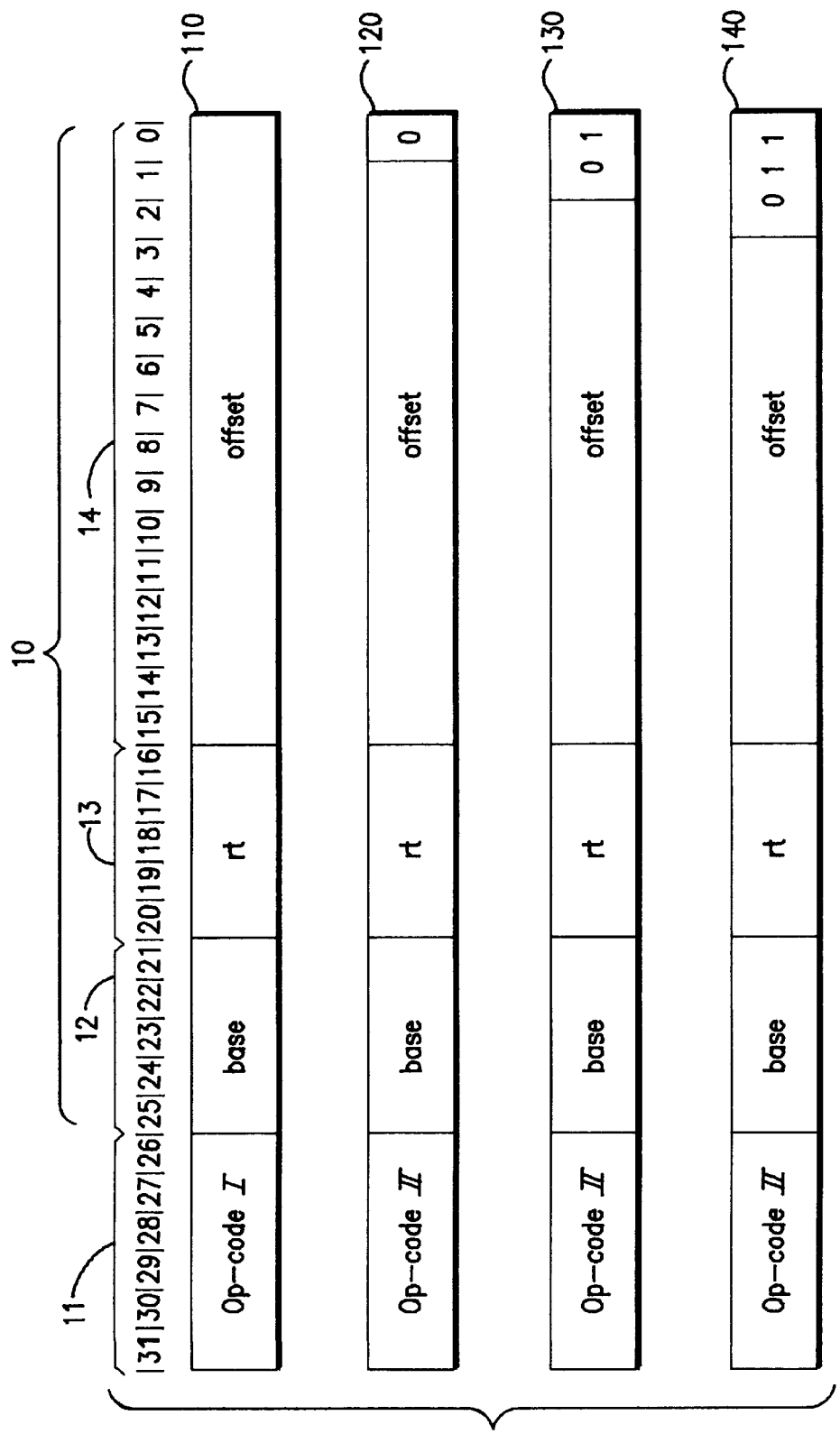
FIG. 3 is an instruction format diagram representative of LOAD or STORE instructions executed by the microprocessor shown in FIG. 2.

Specifically, as is apparent from the comparison between FIG. 1 and FIG. 3, the operation codes among a two-byte LOAD (STORE) instruction 120, a four-byte LOAD (STORE) instruction 130 and an eight-byte LOAD (STORE) instruction 140 are the same as one another as denoted by "Op-Code II". This operation code Op-Code II is in turn different from the operation code Op-code I of a one-byte LOAD (STORE) instruction 110. The detailed codes are as follows:

|  | LOAD Instruction | STORE Instruction |
|---|---|---|
| Op-code I | 100000 | 101000 |
| Op-code II | 100001 | 101001 |

Since the operation codes are in common to the two-byte, four-byte and eight-byte LOAD (STORE) instructions 120, 130 and 140, a part of an offset field portion 14 of an operand field 10 is made different from one another. Specifically, in the two-byte LOAD (STORE) instruction 120, the least significant bit (LSB) B0 thereof is determined to take "0", as shown in FIG. 3. Similarly, the least significant two bits B1 and B0 of the four-byte LOAD (STORE) instruction are determined to take "0" and "1", respectively, and the least significant three bits B2, B1 and B0 of the eight-byte LOAD (STORE) instruction are determined to take "0", "1" and "1", respectively.

Turning to FIG. 2, of the instruction stored in the instruction register 501, the operation field 11 (Bit Nos. 31-26) is supplied to a decoder 502, and the field portion 12 (Bit Nos. 25-21) the second field portion 13 (Bit Nos. 20-16) and a part of the offset field portion 14 (Bit Nos. 15-3) except the least significant three bits B2, B1 and B0 are supplied to an address calculation unit 506. The least significant three bits B2, B1 and B0 are supplied to a mask circuit 504 and a selector 505 and further to the decoder 502.

The decoder 502 responds to the operation code to produce a control signal 5021 which takes a high level when the instruction stored in the register 501 is one of the two-byte, four-byte and eight-byte LOAD and STORE instructions and a low level when the instruction other than the above instructions is decoded. When one of the two-byte, four-byte and eight-byte LOAD and STORE instructions is decoded, the decoder further refers to the least significant three bits B2-B0 of the instruction to discriminate which one of those instructions is currently being decoded. In other cases, the decoder 502 only refers to the operand field. Thus, the decoder 502 produces decoded operation code information 5022 which is in turn supplied to an execution unit (EXU) 503 to command a required data processing operation.

The selector 505 responds to the low level of the control signal 5021 and allows the bits B2-B0 of the offset field portion 14 to pass therethrough to the unit 506. When the control signal 5021 takes the high level, on the other hand, the selector 505 selects the output of the mask circuit 504 and transfers it to the unit 506.

Figure 4:
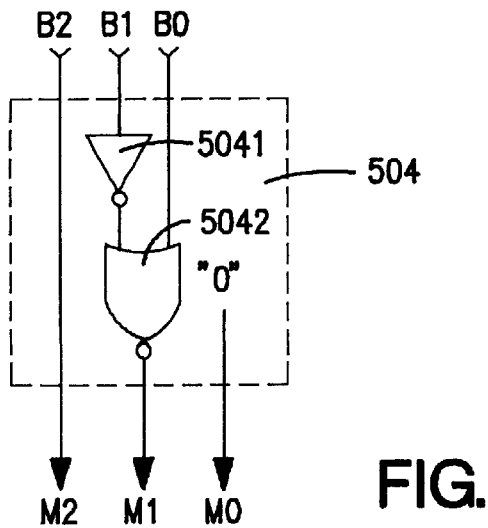
FIG. 4 is a circuit diagram illustrative of a mask circuit shown in FIG. 2.

Referring to FIG. 4, the mask circuit 504 is composed of an inverter 5041 and a NOR gate 5042 which are connected as shown. Accordingly, the mask circuit 504 responds to the data of the bits B2, B1 and B0 and produces mask data consisting of M2, M1 and M0 as shown below.

| B2 | B1 | B0 | M2 | M1 | M0 |
|---|---|---|---|---|---|
| 0 | 0 | 0 | 0 | 0 | 0 |
| 0 | 0 | 1 | 0 | 0 | 0 |
| 0 | 1 | 0 | 0 | 1 | 0 |
| 0 | 1 | 1 | 0 | 0 | 0 |
| 1 | 0 | 0 | 1 | 0 | 0 |
| 1 | 0 | 1 | 1 | 0 | 0 |
| 1 | 1 | 0 | 1 | 1 | 0 |
| 1 | 1 | 1 |  | undefined |  |

Thus, when the two-byte LOAD or STORE instruction is decoded, the address calculation unit 506 always receives the offset value data whose least significant bit is "0". Similarly, the unit 506 always receives the offset value whose least significant two bits are all "0" with respect to the four-byte LOAD or STORE instruction, and receives the offset value data whose least significant three bits are all "0" with respect to the eight-byte LOAD or STORE instruction. Consequently, the microprocessor 500 does not require such a unit that detects and initiates trap exception for an address mis-alignment.

Moreover, in the microprocessor 500, there are not required individual operation codes for the two-byte, four-byte and eight-byte LOAD or STORE instructions. Instructions more than those of the prior art are thus supported or executed by the microprocessor 501.

Figure 5:
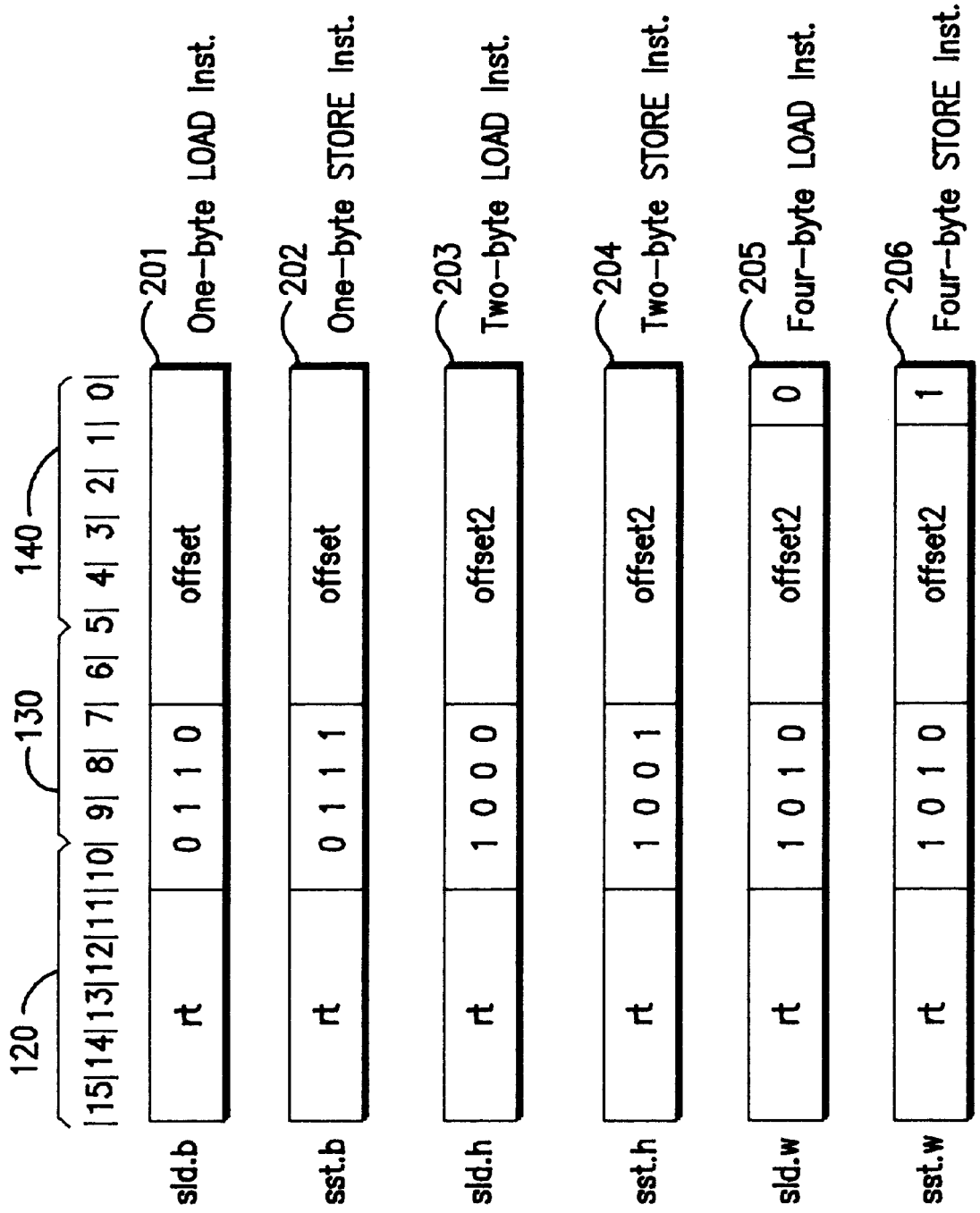
FIG. 5 is an instruction format diagram representative of LOAD and STORE instructions according to another embodiment of the present invention.

Referring to FIG. 5, there are shown formats of six instructions 201–206 according to another embodiment of the present invention. Each of the instructions 201–206 is 16-length and includes a register field 130 (Bit Nos. 15-11) indicative of a source or destination register, an operation field 110 (Bit Nos. 10-7) indicative of an operation code, and an offset field 140 (Bit Nos. 6-0) indicative of offset data from a base address for a memory address. The content of the source or destination register is employed as the base address.

As is apparent from FIG. 5, the operation code of the four-byte LOAD instruction 205 is the same as that of the four-byte STORE instruction 206, and for this reason, the least significant bit (LSB) B0 of the instruction 205 is determined to be set with "0", whereas the LSB B0 of the instruction 206 is determined to be set with "1".

In the instruction formats shown in FIG. 3 or FIG. 5, the positions of the respective fields may be changed. Further, the operation codes of the instructions may be modified.

It is apparent that the present invention is not limited to the above embodiments but may be modified and changed without departing from the scope of spirit of the invention.

What is claimed is:
1. A microprocessor comprising:
   a storage means storing a string of instructions sequentially, each of the string of instructions including an operation field and an operand field,
   the operation field containing one of an operation field code set,
   a first address of the operand field containing one of an immediate data and an offset data;

a decoder means receiving the operation field of a next-to-be-executed instruction from said storage means, and only when the instruction is a predetermined operation field code, a predetermined number of least significant bits of the first address; and an execution unit for controlling the microprocessor in response to a decoded operation code information, said decoder means producing, when the next-to-be-executed instruction is not the predetermined operation field code, an associated decoded operation code information based on the operation field code contained in the operation field independent of the operand field content, said decoder means producing, when the next-to-be-executed instruction is the predetermined operation field code, one of a subset of decoded operation code information, wherein a particular one of the subset of decoded operation code information produced by said decoder means is determined by the value of the predetermined number of least significant bits of the first address.

2. The microprocessor as recited in claim 1, further comprising:

a data changing means, operatively connected to said storage means, receiving the predetermined number of least significant bits of the first address; and an address calculation means, operatively connected to said data changing means, for calculating an address for accessing a memory by using an output of the data changing means;

wherein said data changing means outputs the predetermined number of least significant bits of the first address unchanged when the next-to-be-executed instruction is not the predetermined operation field code, and outputs changed data of the predetermined number of least significant bits of the first address to avoid address mis-alignment when the next-to-be-executed instruction is the predetermined operation field code.

3. The microprocessor as recited in claim 2, wherein said decoder means produces a control signal to said data changing means, changes the control signal to an inactive level when the next-to-be-executed instruction is not the predetermined operation field code, and changes the control signal to an active level when the next-to-be-executed instruction is the predetermined operation field code.

4. The microprocessor as recited in claim 1, wherein the operation field contains information indicative of an operation to be performed, and wherein the operand field contains information for accessing one of a register, memory and peripheral unit.

5. The microprocessor as recited in claim 1, wherein the predetermined number of least significant bits of the first address comprises a least significant bit of the operand field.

* * * * *